J. J. RALYA.
Loose-Pulleys.

No. 134,487.

Patented Dec. 31, 1872.

Witnesses.
H. Poole
John R. Young

Inventor.
Jno. J. Ralya, by
Prindle & Co., his Attys

UNITED STATES PATENT OFFICE.

JOHN J. RALYA, OF CLEVELAND, OHIO.

IMPROVEMENT IN LOOSE PULLEYS.

Specification forming part of Letters Patent No. 134,487, dated December 31, 1872.

*To all whom it may concern:*

Be it known that I, JOHN J. RALYA, of Cleveland, in the county of Cuyahoga and in the State of Ohio, have invented certain new and useful Improvements in Bearings for Loose Pulleys; and do hereby declare that the following is a full, clear, and exact description thereof, reference being had to the accompanying drawing making a part of this specification, in which—

Figure 1:
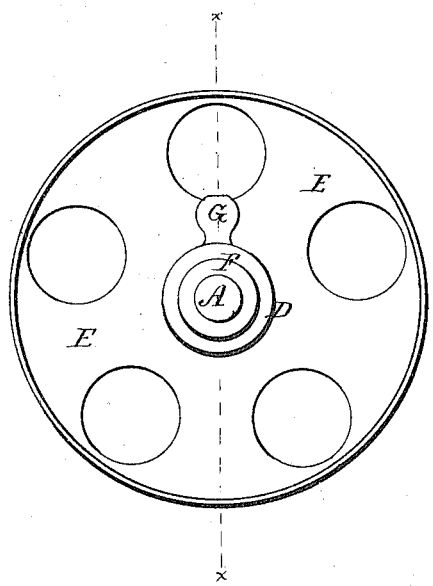
Figure 2:
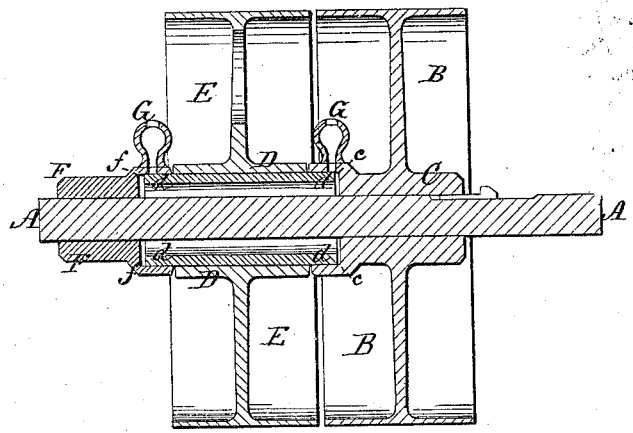

Figure 1 is an end elevation of a countershaft having upon the same my improved pulley, and Fig. 2 is a central section of the same upon line $x$ $x$ of Fig. 1.

Letters of like name and kind refer to like parts in each of the figures.

As ordinarily constructed, loose pulleys are placed directly upon their shafts and held in longitudinal position thereon by means of the hub of the fast pulley and an adjustable collar, which bear against opposite ends of its hub. When thus arranged the loose pulley can only be oiled (through an opening in its hub) after the belt has been run off the same, and as such oiling operation is attended with considerable risk to the operator, it is usually neglected until the bearing-surfaces have become dry and their friction causes a sufficient amount of noise to call attention to the state of affairs. The result of this construction and its consequent difficulties is that the bearing-surfaces of the pulley and shaft soon become worn until the opening in the former is so large as to cause the strain of the belt to throw said pulley so much out of center as to render it difficult, if not impracticable, for the belt to be shifted to or from its periphery, when a new pulley becomes a matter of necessity. This result is unpleasantly frequent in establishments where wood-working machinery is used, and where a high rate of speed is required for the countershafts. In addition to the trouble and expense occasioned by the renewal of pulleys, it is usually the case that the surface of the shaft is so much worn or cut by the pulley as to render necessary a reduction in the size of said shaft in order that a true bearing-surface may be secured for the new pulley.

To obviate these objections is the design of my invention, which consists, principally, in a loose pulley so arranged upon a shaft as to revolve freely around the same without contact with its periphery, substantially as and for the purpose hereinafter specified. It consists, further, in the peculiar construction of the bearings of the loose pulley and their combination with said pulley and the shaft, substantially as and for the purpose hereinafter shown.

In the annexed drawing, A represents a straight cylindrical shaft having secured to or upon its periphery a pulley, B, of ordinary construction. At one end the hub C of the pulley B is enlarged so as to admit of a recess, $c$, being formed within the same, which recess, having any desired dimensions, receives a corresponding neck, $d$, that is formed upon the end of the hub D of a loose pulley, E, and furnishes a bearing for the same and for one end of said pulley. A bearing for the opposite or outer end of the hub D of the loose pulley is formed by means of a second neck, $d$, similar to that before described, which fits into a corresponding recess, $f$, that is provided within the end of an adjustable collar, F. The central opening within the hub D of the loose pulley E is considerably larger than the shaft A and has no bearing upon the latter, all wear being thrown upon the necked ends of said hub and within the recesses $c$ and $f$, respectively, of the hub C and collar F, in consequence of which arrangement no injury can result to the shaft, while, by providing annular grooves within the peripheries of said necks and within the corresponding portions of said recesses, and filling the same with Babbitt metal, all wear can be compensated for, and the parts made true and close whenever necessary by simply removing and replacing said metal in the usual manner. Although the bearings of the loose pulley may form a part of the hub of the same, I prefer to form said bearings by enlarging the opening within said hub and inserting within the same a piece of ordinary gas-pipe having sufficient dimensions to enable its projecting ends to be turned to the desired size. When constructed in this manner the bearings can be renewed, when too much worn for repairs, by removing the old gas-pipe and replacing it by a new one, by which means the loose pulley can be used for an indefinite period of time without material wear or injury. Oil is supplied to the bearings by means of two oil-cups, G, which are placed upon the hub C of the fast pulley and upon the collar F, and caused to communicate with the recesses within said parts through suitable openings which extend from said cups to said recesses. When the counter-shaft is at rest and the belt is running upon the fast pulley, if the oil-cups are upon the upper side their contents will readily pass into the bearings; but if said oil-cups should not occupy the desired position, said shaft may be easily turned by the belt of the machine driven until said cups are uppermost.

The especial advantages obtained by this construction of parts are: First, an entire absence of wear of the shaft, and the consequent necessity for frequently turning the same, or for its renewal more often than would be requisite if used for other purposes; second, the lost motion of the loose pulley may be taken up with the greatest ease, and said pulley made as good as when new at but a trifling cost for labor or material; third, from the facility with which the bearings may be lubricated the durability of the parts is largely increased and the cost of keeping the pulley in repair correspondingly lessened.

Having thus fully set forth the nature and merits of my invention, what I claim as new is—

1. A loose pulley, provided at the ends of its hub with journals which rest within adjustable bearings secured to or upon a shaft, so as to enable said pulley to revolve freely around the latter without contact with its periphery, substantially as and for the purpose specified.

2. The loose pulley E, provided upon its hub D with the necks or journals $d$, in combination with the hub C or collar F, provided with the recesses $c$ or $f$, substantially as and for the purpose shown.

In testimony that I claim the foregoing I have hereunto set my hand this 8th day of November, 1872.

JOHN J. RALYA.

Witnesses:
   W. H. RUNNELLS,
   WM. RUNNELLS.